Patented Feb. 1, 1927.

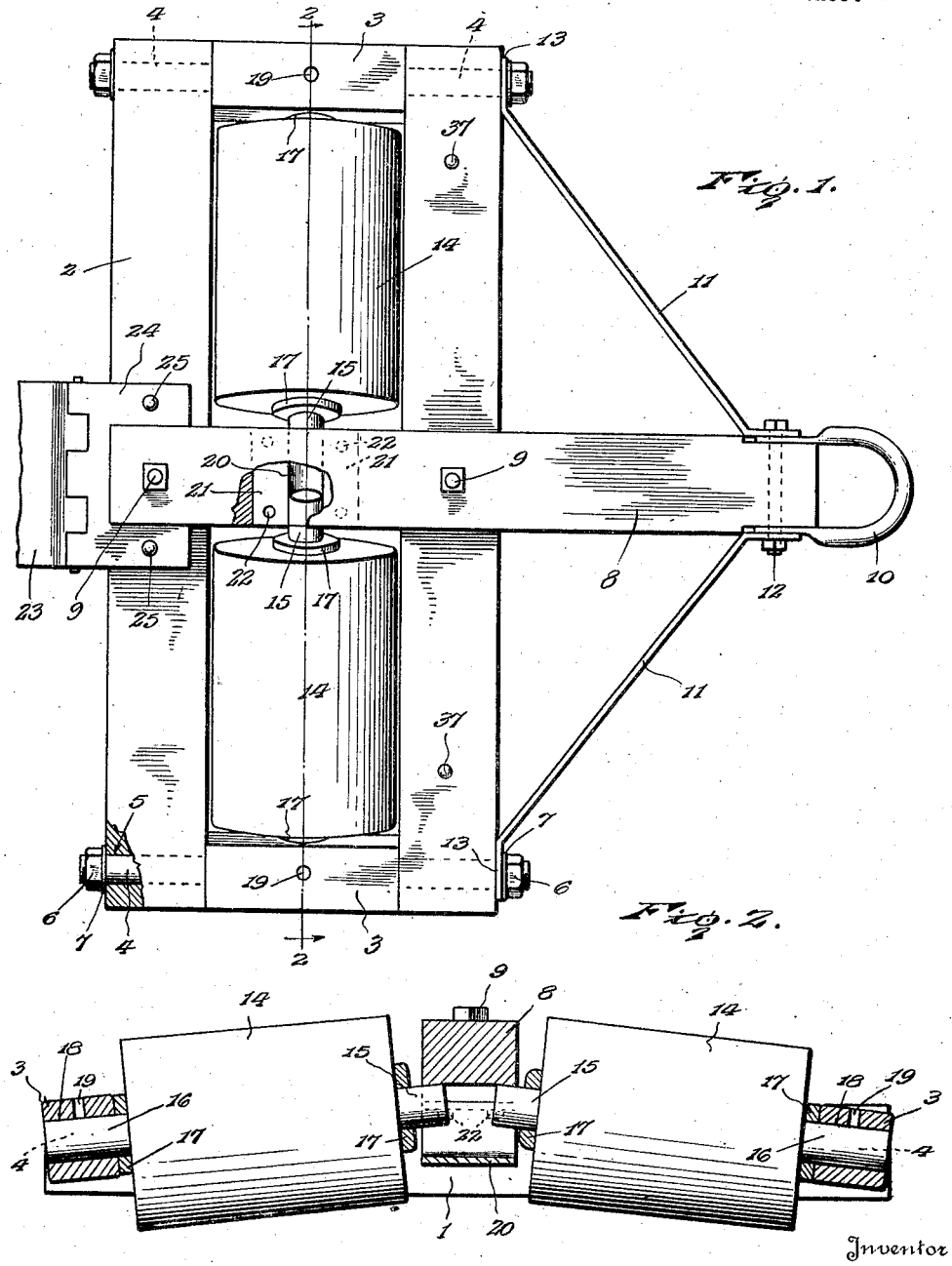

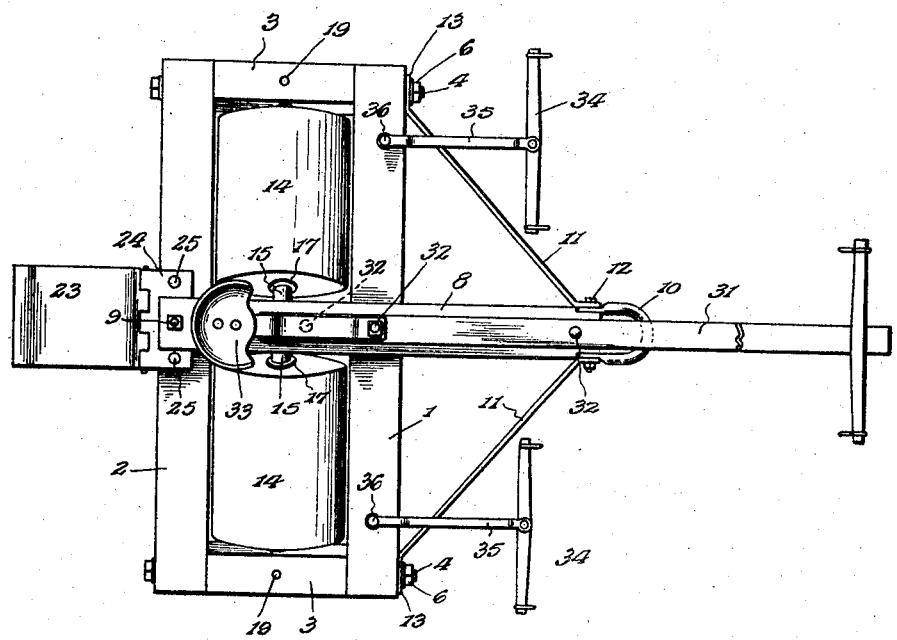
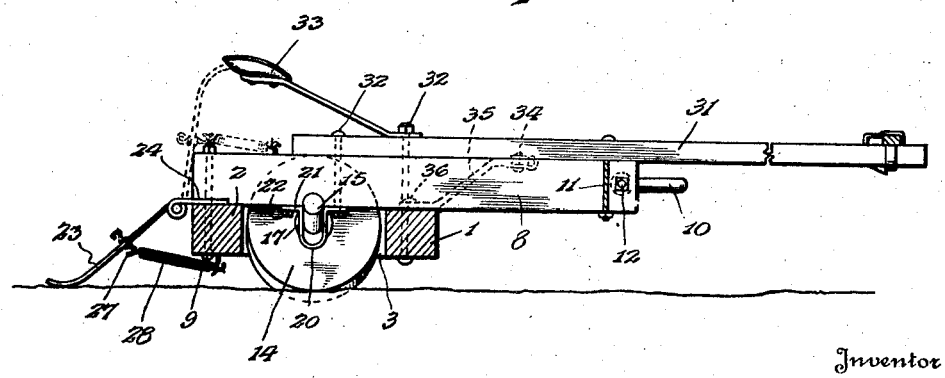

1,615,905

UNITED STATES PATENT OFFICE.

JOHN D. HUNT, OF PROVIDENCE, KENTUCKY, ASSIGNOR OF ONE-THIRD TO ROBERT E. MARTIN AND ONE-THIRD TO THELBERT H. GREER, BOTH OF PROVIDENCE, KENTUCKY.

LAND ROLLER.

Application filed July 22, 1925. Serial No. 45,371.

This invention relates to farm implements and particularly to a land roller of the type used on farms for rolling the ground after grain or other seeds have been drilled but may be used for rolling a roadway or any other surface which it is desired to smooth. One object of the invention is to provide a roller in which the land engaging rollers may have longitudinal tilting movement as said roller is drawn across a field and thereby conform to the contour of the land and cause its entire surface to be acted upon by the rollers. It will, therefore, be seen that if the roller is drawn across a field having a rolling or inclined surface or is drawn along a roadway which slopes from its central point or ridge towards its sides or gutters the rollers will conform to the inclination of the surface and the surface properly smoothed.

This invention is illustrated in the accompanying drawings, wherein—

Figure 1 is a view showing the improved land roller in top plan;

Fig. 2 is a transverse sectional view taken on the line 2—2 of Fig. 1;

Fig. 3 is a top plan view showing the roller modified so that draft animals may be employed as means for drawing the roller across a field, and Fig. 4 is a longitudinal sectional view through the form of roller shown in Fig. 3.

The roller includes a frame provided with forward and rear bars 1 and 2 and side or end bars 3. The side bars are disposed between the ends of the forward and rear bars and secured by pin extensions 4 which are circular in cross section and extend through openings 5 formed in the bars 1 and 2. The outer end portions of the pins 4 are reduced and threaded so that securing nuts 6 may be screwed upon them to securely hold the end bars and forward and rear bars in engagement with each other. Washers 7 are provided for engagement by the inner ends of the nuts and the nuts may be secured in a set position upon the pins by any means desired so that the pins may turn in the openigs 5 without danger of the nuts working loose. The draft tongue 8 extends across the frame and is secured upon the upper faces of the forward and rear bars by bolts or other suitable fastenings 9 which extend through the draft tongue and forward and rear bars of the frame. The tongue may be any desired length and at its forward end is provided with a clevis 10 so that a tractor or draft animals may be connected with the draft tongue. Braces 11 are provided for the extended forward end portion of the tongue 8 and have their forward end portions secured by a bolt 12 which extends through the tongue and arms of the clevis 10. The rear end portions of the braces are bent to provide feet 13 through which the forwardly extending pins 4 are passed before the nuts 6 are applied. The frame will, therefore, have a simple but very strong construction.

Rollers 14 are disposed in the frame between the end bars 3 and draft tongue 8 and are of a diameter which will permit them to fit snugly between the forward and rear bars 1 and 2 of the frame. Axles 15 and 16 extend from the inner and outer ends of the rollers 14 and carry thick washers or collars 17 which serve to space the ends of the rollers from the end bars 3 and the draft tongue. This reduces wear upon the rollers and also prevent them from having frictional binding engagement with the end bars or draft tongue. The outer axles 16 are rotatably fitted in bearings 18 formed transversely of the end bars, and openings 19 lead from the upper faces of the end bars and communicate with the bearings 18 so that oil may be fed through the openings 19 onto the shafts 16. The inner shafts 15 are somewhat shorter than the outer shafts 16 and extend into opposite side portions of a bearing carried by the draft tongue 8. The bearing which is carried by the draft tongue is provided with a U-shaped shaft receiving portion 20 which is disposed vertically beneath the tongue 8 and has the upper end portions of its arms bent to provide attaching feet 21 which are secured against the underface of the tongue by screws or other suitable fasteners 22. It should be noted that the bearing 20 has a depth which is materially greater than the diameters of the shafts 15 so that the shafts 15 may not only rotate in the bearing 20 but also have vertical sliding movement therein. It will thus be seen that, when the implement is being drawn across a field or along a road, the shafts 15 may slide vertically in the bearing 20 and the end bars 3 rotate about their longitudinal axes so that the rollers will follow uneven surfaces and act upon the entire surface of a field or roadway and effectively smooth the same. When the field which is being rolled is flat, the rollers will be disposed horizontally but when the surface of the field is disposed at an incline the rollers will either move upwardly or downwardly in order to dispose themselves at the proper longitudinal incline to act upon its entire surface as the implement is moved forwardly.

Referring to Fig. 2, it will be seen that the inner ends of the rollers 14 are spaced from each other and, therefore, the portion of the road or field between the inner ends of the rollers will not be smoothed as the land roller is drawn forwardly. In order to smooth this strip of ground there has been provided a scraper blade 23 which is disposed at the rear of the frame and hingedly connected with a bracket 24 secured upon the upper face of the rear bar 2 by bolts 25. A hook 27 extends from the blade and is engaged by a spring 28 which serves to draw the blade into pressing engagement with the ground. Therefore, as the machine is moved forwardly the surface of the road or field between the inner ends of the rollers will be acted upon by the blade 23 and this portion of the road or field smoothed.

If it is desired to have the land roller moved forwardly by means of a tractor, the clevis 10 will be engaged with the tractor and it will not be necessary for an operator to follow or ride upon the machine. In some cases, it is desirable to have the land roller drawn forwardly by means of draft animals in which case a draft tongue 31 will be put in place with its rear end portion resting upon the draft tongue 8 and secured thereon by bolts 32, one of which will take the place of the forward bolt 9 and will be of such length that it may also serve as means for securing the seat 33 to be occupied by the operator of the roller. The singletrees 34 with which the draft animals will be connected are provided with elongated mounting links or strips 35 which are of such length that, when they are fastened at their rear ends by bolts 36 which pass through openings 37 formed in the forward bar 1 of the roller frame, the singletrees will be disposed in advance of the diagonal braces 11.

Having thus described the invention, I claim:

A land roller comprising a frame including front and rear bars, side bars fitting between said front and rear bars, securing pins extending from the ends of said side bars through openings formed transversely in said front and rear bars to rockably mount the side bars, said side bars being formed with transversely extending sockets intermediate their ends, a tongue extending across said frame and secured upon the upper faces of said front and rear bars intermediate their ends and projecting from the front bar, a bearing bracket secured against the under face of said tongue between the front and rear bars and including a depending U-shaped portion open at its sides and disposed between the sockets of said side bars, and rollers disposed in said frame between said tongue and side bars and provided with spindles extending from their ends and rotatably mounted in the sockets of said side bars and depending U-shaped portion of the bearing carried by said tongue, the spindles fitted into said bearing being slidable vertically.

In testimony whereof I affix my signature.

JOHN D. HUNT. [L. S.]